US012785576B2

(12) United States Patent
Mclean

(10) Patent No.: US 12,785,576 B2
(45) Date of Patent: Nov. 3, 2026

(54) CONTROLLER FOR AN ISOLATED INDUCTOR-INDUCTOR-CAPACITOR (LLC) POWER CONVERTER CIRCUIT

(71) Applicant: Hamilton Sundstrand Corporation, Charlotte, NC (US)

(72) Inventor: Andrew Mclean, Halesowen (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 176 days.

(21) Appl. No.: 18/775,252

(22) Filed: Jul. 17, 2024

(65) Prior Publication Data

US 2025/0047209 A1 Feb. 6, 2025

(30) Foreign Application Priority Data

Aug. 1, 2023 (EP) .................................... 23189070

(51) Int. Cl.
*H02M 3/335* (2006.01)
*H02M 1/00* (2007.01)
*H02M 3/00* (2006.01)

(52) U.S. Cl.
CPC ..... *H02M 3/33592* (2013.01); *H02M 1/0009* (2021.05); *H02M 3/01* (2021.05); *H02M 3/33571* (2021.05)

(58) Field of Classification Search
CPC ......... H02M 3/33592; H02M 3/33571; H02M 3/01; H02M 31/009
See application file for complete search history.

(56) References Cited

U.S. PATENT DOCUMENTS 8,199,534 B2 6/2012 Halberstadt
9,203,318 B2 12/2015 Scibilia
9,837,907 B1 12/2017 Babazadeh et al.
10,050,545 B2 * 8/2018 Jitaru .................. H02M 3/3353
(Continued)

FOREIGN PATENT DOCUMENTS

EP 3552458 B1 9/2022
WO 2018104087 A1 6/2018

OTHER PUBLICATIONS

Bong-Chul et al. "The Novel Synchronous Rectifier Driving Method for LLC Series resonant Converter", IECON 2012—38th Annual Conference on IEEE Industrial Electronics Society, IEEE, Oct. 25, 2012, pp. 810-813.
(Continued)

*Primary Examiner* — Sisay G Tiku
(74) *Attorney, Agent, or Firm* — CANTOR COLBURN LLP

(57) ABSTRACT

A controller, a circuit, an aircraft electrical system and a method for controlling an isolated (inductor-inductor-capacitor) LLC power converter circuit. The circuit comprising an isolated transformer, and a first switch operable as a synchronous rectifier on a secondary side of the transformer. The controller comprises a current determination module configured to determine a primary winding current on a primary side of the isolated transformer; and a processing module configured to use the determined primary winding current in a processing algorithm to output a first control signal to configure the first switch on the secondary side of the isolated transformer to determine a waveform of a secondary winding current of the isolated transformer.

17 Claims, 4 Drawing Sheets

(56) References Cited

U.S. PATENT DOCUMENTS

| | | | | |
|---|---|---|---|---|
| 10,917,017 | B1 | 2/2021 | Mcfarland et al. | |
| 11,172,554 | B2 * | 11/2021 | Deng | H05B 45/37 |
| 11,594,976 | B2 | 2/2023 | Kumar et al. | |
| 2011/0267844 | A1 * | 11/2011 | He | H02M 3/3378 363/21.02 |
| 2015/0124489 | A1 * | 5/2015 | Dai | H02M 3/335 363/17 |
| 2019/0036456 | A1 * | 1/2019 | Coulson | H02M 3/24 |
| 2025/0158515 | A1 * | 5/2025 | McLean | H02M 3/33592 |

OTHER PUBLICATIONS

European Search Report for Application No. 23189070.8, mailed Jan. 22, 2024, 8 pages.

Wei, et al. "Synchronous Rectification for LLC Resonant Converter: An Overview", IEEE Transactions on Power Electronics, vol. 36, No. 6, Jun. 2021, pp. 7264-7280.

* cited by examiner

CONTROLLER FOR AN ISOLATED INDUCTOR-INDUCTOR-CAPACITOR (LLC) POWER CONVERTER CIRCUIT

CROSS-REFERENCE TO RELATED APPLICATIONS

This application claims the benefit of European Patent Application No. 23189070.8 filed Aug. 1, 2023, the disclosure of which is incorporated herein by reference in its entirety.

FIELD OF THE INVENTION

The invention relates to a controller, a circuit, an aircraft electrical system and a method for controlling an isolated LLC synchronous rectifier converter circuit.

BACKGROUND

An LLC converter circuit is a circuit that has resonant components, such as two inductors and a capacitor (the term "LLC" thus usually refers to an inductor-inductor-capacitor combination in a circuit), and which converts input power having first characteristics to an output power having different characteristics. LLC converter circuits utilise resonant tank components, for example inductors and capacitors, together with a transformer and rectifier diodes to provide energy conversion.

Synchronous rectifiers utilise switches, typically MOSFET's, instead of rectifier diodes. MOSFET's are preferred to rectifier diodes because of their low ON state resistance, which results in lower static power losses compared to the forward voltage drop of rectifier diodes.

To work efficiently, the current through the MOSFET is sensed and controlled to switch OFF at a time when the current is at a minimum. A control signal with accurate timing is required to switch the MOSFET in this manner. There remains scope for providing improved synchronous rectifier operation for isolated LLC converter circuits.

SUMMARY

In a first aspect there is provided a controller for an isolated LLC power converter circuit, the circuit comprising an isolated transformer, and a first switch operable as a synchronous rectifier on a secondary side of the transformer. The controller comprises a current determination module configured to determine a primary winding current of the isolated transformer; and a processing module configured to use the determined primary winding current in a processing algorithm to output a first control signal to configure the first switch on the secondary side of the isolated transformer to determine a waveform of a secondary winding current of the isolated transformer.

In some applications, for example when there is a high voltage, low current input on a primary side of the transformer which is converted into a low voltage, high current output on a secondary side of the transformer, any impedance introduced into the secondary side can lead to power losses due to the high output current. However, such impedance is typically used to measure the synchronous rectifier current and to determine a control signal for synchronous control of the switching rectifier (for example, the first switch).

An impedance introduced into the secondary side may be, for example, an inductance introduced into the synchronous rectifier drain current sense resistance path (for example, device parasitic lead inductance) which can exacerbate drain current measurement errors, leading to power losses due to the high output current. The synchronous rectifier ON state resistance or a dedicated sense resistance is typically used to indirectly measure the synchronous rectifier current and to determine a control signal for synchronous control of the switching rectifier.

In the present invention, because the first switch on the secondary side of the transformer is controlled based on the primary winding current, there is no need introduce an impedance on the secondary side of the transformer, in order to provide a synchronous control signal to the first switch. As a result, the present invention is able to reduce power losses typically associated with providing synchronous control.

Additionally, for a step-down converter circuit, because the transformer primary winding current is relatively lower than the current on the secondary side, components needed to determine the transformer primary winding current may be less costly (due to their lower current ratings) when compared with components needed to determine the transformer secondary winding current (due to their higher current ratings). In some circumstances, the components used to determine the transformer primary winding current may already be used for other functions in the converter circuit. As such, the present invention can be more cost effective to implement and manufacture.

The processing algorithm may comprise determining a difference value between the determined primary winding current and an estimated magnetising current of the isolated transformer, and using the difference value to determine the first control signal. In an isolated converter topology, considering the magnetising current of the transformer is an effective way of determining a synchronous control signal.

If the difference value is equal to zero, the processing module may change the output of the first control signal to the first switch. Controlling the first switch based on when the primary winding current and magnetising current are equal is an effective way of providing synchronous control.

The change may comprise configuring the first switch into an open configuration. By providing a control signal which opens the first switch at the correct time, any intrinsic diode power losses which may have otherwise developed because of the switch opening prematurely are reduced or eliminated. As such, the circuit can operate in a more efficient manner.

The controller may comprise an estimation module configured to determine the estimated magnetising current. The magnetising current can reliably be estimated rather than being sensed, which allows the estimation module to provide the estimated magnetising current without incurring any power losses associated with sensing the magnetising current.

The estimation module may be configured to determine the estimated magnetising current based on the primary winding current.

The estimation module may be configured to determine the estimated magnetising current by integrating the transformer primary winding voltage differential with respect to time, divided by a primary magnetising inductance.

The estimation module may be configured to determine the estimated magnetising current by consulting a look-up table.

The estimation module may be configured to apply an adjustment to the estimated magnetising current in determining the estimated magnetising current. Applying an adjustment is an effective way of accounting for factors which may affect the performance of the circuit or determination of the synchronous rectifier optimum turn OFF point.

The adjustment may be indicative of a manufacturing tolerance of the isolated transformer. There are part to part variations when manufacturing which lead to differences in the magnetising characteristics of manufactured transformers. An adjustment can take into account, for example, statistical average differences, to improve the overall performance of synchronous rectifier operation of isolated LLC converter circuits which include manufactured transformers.

The estimation module may be configured to apply the adjustment by adding of a constant value.

The processing module may be further configured to use the determined primary winding current and the estimated magnetising current in the processing algorithm to output a second control signal to configure a second switch on a secondary side of the isolated transformer; wherein the configuration of the second switch provides rectification of a negative component of the secondary winding current.

The configuration of the second switch may provide rectification of a negative half cycle of the secondary winding current.

By providing a second switch on the secondary side, full-wave rectification of the secondary winding current can be provided.

The estimation module may be configured to determine if the estimated magnetising current is increasing or decreasing.

The estimation module may be configured to apply the adjustment by adding a first constant value when the estimated magnetising current is increasing.

The estimation module may be configured to apply the adjustment by subtracting the first constant value when the estimated magnetising current is decreasing.

The estimation module may be configured to apply the adjustment by subtracting a second constant value when the estimated magnetising current is decreasing.

The estimation module may be configured to apply the adjustment by applying a hysteresis effect to the estimated magnetising current as the estimated magnetising current increases and decreases.

Applying an adjustment (for example, a constant of opposite sign) is necessary for the increasing and decreasing components of the estimated magnetising current, due to the bipolar nature of the primary winding current waveform.

In a second aspect there is provided an isolated LLC power converter circuit for converting an input power to provide an output power, the circuit comprising an isolated transformer having a primary side and a secondary side; a first switch operable as a synchronous rectifier on a secondary side of the transformer; and the controller of the first aspect. The configuration of the first switch determines a waveform of the output power.

The circuit may comprise a second switch on a secondary side of the transformer, wherein the configuration of the second switch provides rectification of a negative component of the transformer secondary current to provide full wave rectification.

The input power may have a voltage relatively higher than the output power, and a current relatively lower than the output power.

The circuit may be a step-down converter. The ratio between the input and output voltage may be 20:1. The turns ratio between the transformer primary side and secondary side may be 10:1.

The input power on the transformer primary winding may be a square-wave of 540 V peak-peak and 20 A peak sinusoidal current waveform, and the output power on the transformer secondary winding may be a 56 V peak-peak square-wave and 200 A peak rectified current waveform.

In a third aspect there is provided an aircraft electrical system comprising an electrical load and the controller of the first aspect or the circuit the second aspect.

The load may be an electrical system which forms a part of an aircraft Low Voltage distribution network.

In a fourth aspect there is provided a method for controlling an isolated LLC power converter circuit, the circuit comprising an isolated transformer, and a first switch operable as a synchronous rectifier on a secondary side of the transformer; the method comprising: determining a primary winding current of the isolated transformer; using the determined primary winding current to determine a first control signal for the first switch on the secondary side of the isolated transformer; and implementing the first control signal to control the first switch, wherein the configuration of the first switch determines a waveform of a secondary winding current of the isolated transformer.

The circuit of the second aspect, the aircraft electrical system of the third aspect and the method of the fourth aspect may comprise any of the features of the examples described with respect to the first aspect, including features derived from functional steps.

BRIEF DESCRIPTION OF THE DRAWINGS

Various examples will now be described with reference to the accompanying drawings in which.

DETAILED DESCRIPTION

Figure 1:
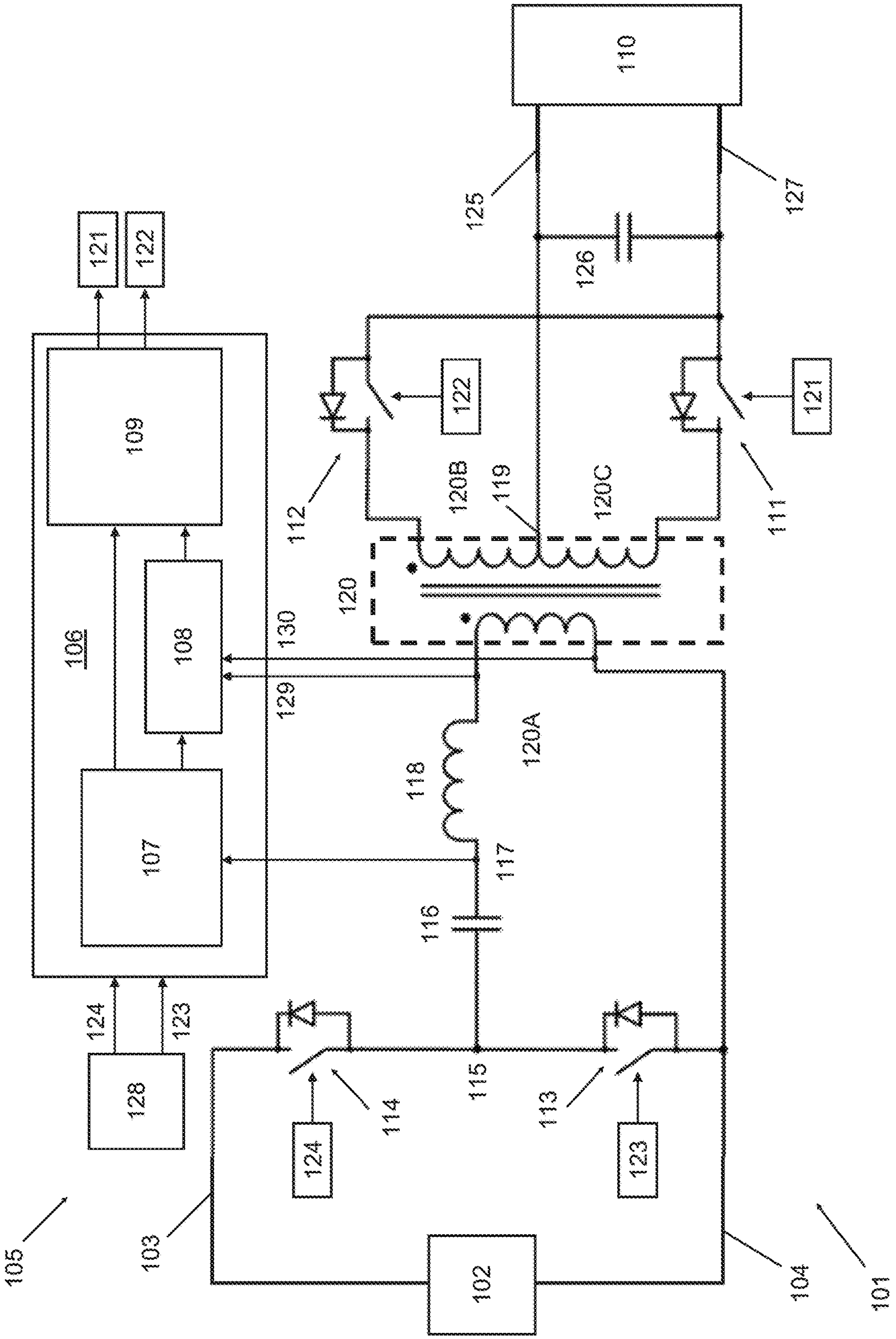
FIG. 1 shows an aircraft electrical system comprising a power source, an isolated LLC synchronous rectifier converter circuit, a controller and a load.

With reference to FIG. 1, an aircraft electrical system 101 includes a power source 102, an isolated LLC converter circuit (henceforth referred to as the "circuit") 105, a controller 106, a primary switch controller 128, and a load 110.

The power source 102 outputs electrical power via a positive conductor 103 and a negative or neutral conductor 104. The power source 102 is connected to the circuit 105 by the conductors 103, 104. The conductors 103, 104 are thus configured to transfer power from the power source 102 to the circuit 105.

The power source 102 outputs direct current (DC) high voltage power, for example at 540 V and 40 A.

The circuit 105 is configured to receive power from the power source 102 and output power at a lower voltage, for example 28 V, to the load 110. The circuit 105 is thus a type of step-down voltage converter. As a result of stepping down the voltage, the current output from the circuit 105 is higher compared to the current output from the power source 102.

However, in some examples, the circuit 105 may not operate as a step-down converter.

The circuit 105 comprises a first switch 111, a second switch 112, a third switch 113, a fourth switch 114, a first resonant capacitor 116, a resonant inductor 118, a transformer 120, and a second capacitor 126.

The first, second, third and fourth switches 111, 112, 113, 114 are, in this example, MOSFET switches, and therefore each of the switches 111, 112, 113, 114 includes a body diode.

The primary switch controller 128 is connected to the third switch 113 and the fourth switch 114. The primary switch controller 128 outputs a third control signal 123 to the third switch 113 and a fourth control signal 124 to the fourth switch 114. In this manner, the primary switch controller 128 is configured to control the third and fourth switches 113, 114. The third and fourth switches 113, 114 are, for example, high voltage MOSFET power switches rated at or above 540 V and 40 A.

The power source 102 is connected via the positive conductor 103 to the fourth switch 114. The third switch 113 is connected to the fourth switch 114 and to the negative conductor 104. The power source 102, first conductor 103, fourth switch 114, third switch 113 and negative conductor 104 are thus in series and form a complete circuit loop.

There is a connection point 115 between the fourth switch 114 and the third switch 113. The first resonant capacitor 116 is connected to the connection point 115, and the resonant inductor 118 is connected to the first resonant capacitor 116. A first terminal of a primary side winding 120A of the transformer 120 is connected to the inductor 118. A second terminal of the primary side winding 120A is connected to the negative conductor 104. The first resonant capacitor 116, the resonant inductor 118 and the primary side winding 120A are thus in series.

The primary side winding 120A has a number of turns, n, wound around a transformer core of the transformer 120. The transformer 120 comprises a secondary side first winding 120B and a secondary side second winding 120C, each of which are wound around the transformer core and have the same number of turns, m. A ratio between n:m determines the step-down ratio/turns ratio of the circuit 105.

The primary side winding 120A and the secondary side windings 120B, 120C of the transformer 120 are electrically isolated from one another. This means that there is no electrical connection between the primary side winding 120A and the secondary side windings 120B, 120C.

The primary side winding 120A is magnetically coupled to the secondary side windings 120B, 120C via induction of a magnetic field in a magnetic core of the transformer 120. This allows for power transfer from a primary side of the transformer 120 (i.e. the primary side winding 120A) to a secondary side of the transformer 120 (i.e. the secondary side windings 120B, 120C).

As such, the transformer 120 may be referred to as "isolated" because it does not have a physical electrical connection between the primary side and the secondary. However, electrical power can be (and is) transferred from the primary side of the transformer 120 to the secondary side of the transformer 120 through a magnetic field.

The secondary side windings 120B, 120C are the same physical coil, but function (from an electrical standpoint) as two separate coils, because of a centre tap 119. The centre tap 119 is a connection between the secondary side first winding 120B and the secondary side second winding 120C which electrically ties the secondary side windings 120B, 120C together. This allows current to flow into or out of the coils 120B, 120C from the centre tap 119, as discussed below.

Because the transformer 120 provides a step-down in voltage, electrical components connected between the power source 102 and the primary side of the transformer 120 are referred to as high voltage components rated at or above 540 V. Thus, the third and fourth switches 113, 114, the capacitor 116, and the inductor 118 are high voltage components.

The load 110 is connected to the circuit 105 via a positive load conductor 125 and a negative or neutral load conductor 127. The second capacitor 126 is connected between the conductors 125, 127.

The positive load conductor 125 is connected to the centre tap 119. In a first electrical loop, the positive load conductor 125 is connected in series with the centre tap, the secondary side first winding 120B, the second switch 112 and the negative load conductor 127. In a second electrical loop, positive load conductor 125 is connected in series with the centre tap 119, the secondary side second winding 120C, the first switch 111 and the negative load conductor 127. Thus, the secondary side of the transformer 120 provides two current paths to the load 110, in opposite directions through the coils 120B, 120C. However, the circuit 105 topology enables each of the current paths output at the positive load conductor 125 and return at the negative load conductor 127.

The controller 106 comprises a current determination module 107. The current determination module 107 is connected to the circuit 105 on the primary side of the transformer 120. In this example, the current determination module 107 is connected at an electrical connection 117 located between the first capacitor 116 and the inductor 118. In other examples, the electrical connection 117 can be anywhere in series with the primary side winding 120A.

Although this example discloses the current determination module 107 having the electrical connection 117 to the circuit 105, various other connections or sensing techniques are possible, such as using a hall effect sensor for current measurement, or using a transformer coupled to the inductor 118.

The current determination module 107 is connected to a processing module 109 and an estimation module 108. The estimation module 108 is also connected to the processing module 109.

The estimation module 108 receives a primary side winding 120A voltage through connection lines 129, 130. The connection lines 129, 130 may provide a voltage directly to the estimation module 108, or a value or measurement from which the estimation module 108 or the controller 106 can determine the primary side winding 120A voltage.

The processing module 109 outputs a first control signal 121 to the first switch 111 and a second control signal 122 to the second switch 112. In this manner, the controller 106 controls each of the switches 111, 112.

The controller 106 receives the third control signal 123 and the fourth control signal 124 from the primary switch controller 128. The third and fourth control signals 123, 124 are used by the controller 106 to determine the first and second control signals 121, 122 as described below.

Although in this example the controller 106 comprises the determination module 107, estimation module 108 and processing module 109, it is to be understood that each of the modules 107, 108, 109 may all be part of a single module/controller, and physically separate "modules" might not be present. The functions within a module may also be performed across multiple controllers. Some of the modules might be remote to the controller.

Figure 2:
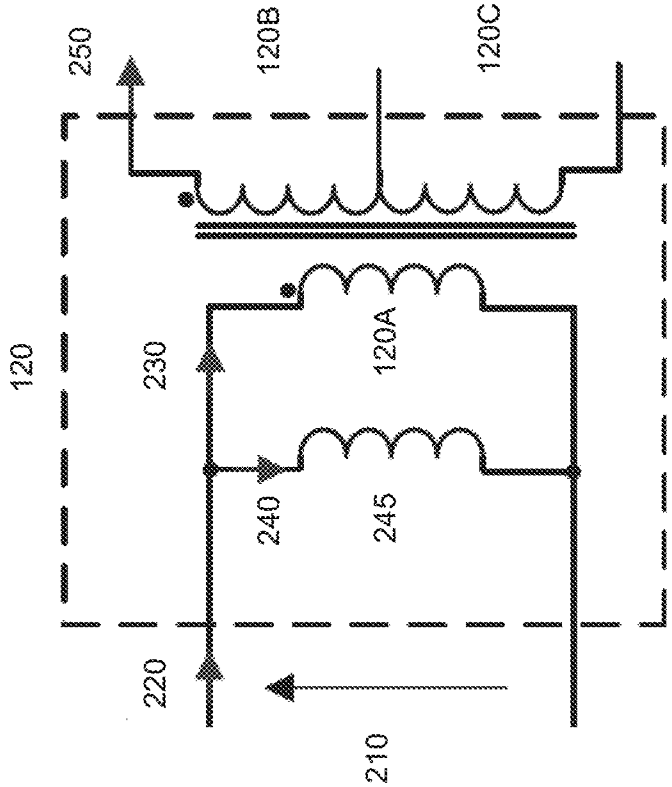
FIG. 2 shows an equivalent circuit of the transformer of the isolated LLC converter.

FIG. 2 depicts an equivalent circuit of the transformer 120, and in particular, shows conceptual current paths in the transformer.

A primary winding current 220 (which carries the same current as the resonant inductor 118) is provided to the transformer 120. The primary winding current 220 is sinusoidal in nature and can be considered to split into two currents comprising a reflected secondary winding current 230 and a magnetising current 240. The magnetising current 240 drives the magnetic field which builds in the transformer 120 core. The primary winding magnetising inductance is represented by 245.

The current in the transformer secondary windings 120C (or 120B) is proportional to the load current and produces the reflected secondary current 230 through the transformer turns ratio.

The above-described circuit topology causes the circuit 105 to function as a half-bridge converter, in which the power source 102 provides constant DC power to the circuit 105, for example at 540 V and at 40A. The primary switch controller 128 provides the third and fourth control signals 123, 124 to the third and fourth switches 113, 114, which causes the third and fourth switches 113, 114 to alternatively open and close in a complimentary manner, with time delays in between the switching, which converts the DC input waveform into a type of square wave. The first capacitor 116 and inductor 118 provide a resonant energy "storage tank", which results in the current provided to the transformer having a sinusoidal waveform, including positive and negative components. In this manner, DC power is converted into AC power.

When the square-wave voltage produced by the half-bridge (third and fourth switches 113, 114) is applied on the primary side winding 120A, a magnetic field develops in the core of the transformer 120. Because the primary side winding 120A and the secondary side windings 120B, 120C are magnetically coupled through the transformer core, the magnetic field induces a voltage onto the secondary side windings 120B, 120C. The induction of the voltage onto the secondary side windings 120B, 120C causes a resonant current (half-sinusoidal in nature when operated at the resonant frequency) to flow on the secondary winding of the transformer 120.

The turns ratio of the windings of the primary side winding 120A and the secondary side windings 120B, 120C determines the magnitude of the voltage on the secondary side. By setting the turns ratio appropriately, the voltage is stepped down. The turns ratio can be denoted as primary side winding to first secondary side winding and to second secondary side winding (Np:Ns1:Ns2). In this example, the turns ratio is 10:1:1. Because the input voltage is 540 V, the first secondary side winding voltage will be 28 V and the second secondary side winding voltage will be 28 V.

The sinusoidal primary winding current 220 has positive and negative components. This means the primary winding current 220 will flow in a positive direction and in a negative direction. For complete power transfer from the primary side to the secondary side of the transformer 120, both components of the primary winding current 220 must be transferred to the secondary windings. This is achieved by the secondary side windings 120B, 120C and the centre tap 119.

To initiate a first power transfer cycle, the primary side controller 128 provides the fourth control signal 124 to the fourth switch 114, which causes the fourth switch 114 to turn ON (i.e. enter the closed configuration). At the same time, the primary side controller 128 provides the third control signal 123 to the third switch 113 to turn the third switch 113 OFF. This allows the primary winding current 220 to flow in a positive direction (for example, clockwise in FIG. 1). The synchronous rectifier first switch 111 body diode conducts, allowing current to conduct through the secondary side second winding 120C, and hence provide power to the load 110.

To reduce power dissipation or wastage in the first switch 111, the first switch 111 should be turned ON (i.e. enter the closed configuration) for the remainder of the switching frequency period. In this scenario, current on the secondary side of the transformer 120 will flow from the secondary side second winding 120C via the load positive conductor 125 into the load 110, and return from the load 110 via the load negative conductor 127, through the first switch 111 and into the secondary side second winding 120C. This current path on the secondary side may be referred to as the secondary side positive current path.

To initiate a second power transfer cycle, the primary side controller 128 provides the third control signal 123 to the third switch 113, which causes the third switch 113 to turn ON (i.e. enter the closed configuration). At the same time, the primary side controller 128 provides the fourth control signal 124 to the third switch 114 to turn the fourth switch 114 OFF. This allows the primary winding current 220 to flow in a negative direction (for example, anti-clockwise in FIG. 1). The synchronous rectifier second switch 112 body diode conducts, allowing current to conduct through the secondary side first winding 120B, and hence provide power to the load.

To reduce power dissipation or wastage in the second switch 112, the second switch 112 should be turned ON (i.e. enter the closed configuration) for the remainder of the switching frequency period. In this scenario, the current on the secondary side of the transformer 120 will flow from the secondary side first winding 120B via the load positive conductor 125 into the load 110, and return from the load 110 via the load negative conductor 127, through the second switch 112 and into the secondary side first winding 120B. This current path on the secondary side may be referred to as the secondary side negative current path.

The current will flow in this manner as a result of the switching of the switches 111, 112, 113, 114, and the winding direction of the transformer 120 primary side and secondary side windings, as shown by the dot in FIG. 1.

In this manner, the negative component of the primary side current 220 is rectified, and, in the present example, the power output to the load 110 is a DC power at a lower voltage than the power output from the power source 102.

In order to efficiently provide the above mentioned power conversion, accurate control signals must be provided to the switches 111, 112 relative to the magnitude of the respective switch 111, 112 drain current. The control signals must take into consideration various characteristics of the current waveforms on the primary and on the secondary side of the transformer 120.

For a step-down voltage converter which outputs a relatively high current (for example, 400A) there is an added importance to correctly switch the secondary side switches (first and second switches 111, 112) during the period in which the body diode is conducting. This is because power dissipated or wasted in the first and second switches 111, 112 as a result of the body diode carrying the load current is significantly higher than when the first or second switch 111, 112 is closed. Thus, not closing the first or second switch 111, 112 is in a timely manner, would cause particularly significant power losses, which would reduce the overall power efficiency of the circuit 105.

Known methods to provide a control signal for the secondary side switches include sensing a voltage or sensing a current on the secondary side. A voltage is sensed by measuring the voltage drop across the respective switch being controlled, and determining the control signal based on the measured voltage. However, this can be problematic due to unavoidable parasitic inductances in the current path of the measured voltage causing premature turn off of the switch/es.

A current can be sensed by placing resistors in series with the switches. However, in a high current output circuit, any additional resistance added to the circuit can cause notable power losses.

The present invention provides a means to determine the optimum point at which to turn OFF the MOSFET switch without the use of secondary-side current sensors or Vds sensing. The description herein relates to a LLC Half Bridge, but the disclosure also applies to Full Bridge LLC and variants.

With continued reference to FIG. 2, the primary winding current 220 is the sum of the magnetising current 240 and the reflected secondary current 230, as denoted in Equation 1.

$$I_p = I_{mag} + I'_{sec} \tag{1}$$

Where the primary winding current 220 is $I_p$, the magnetising current 240 is $I_{mag}$ and the reflected secondary current 230 is $$I'_{sec}.$$

The ideal switching time is when the first or second switch 111, 112 drain current (and thus also the reflected secondary current 230) is zero. This can be determined by setting the reflected secondary current 230 ($1'_{sec}$) in Equation 1 to zero, as denoted in Equation 2.

$$I_p = I_{mag} + 0 \tag{2}$$

Equation 2 thus denotes the conditions required to determine the ideal switching time, based on primary side currents ($I_p$ and $I_{mag}$). The conditions for Equation 2 are met when the primary side current $I_p$ intersects with (and is equal to) the magnetizing current $I_{mag}$.

Figure 4:
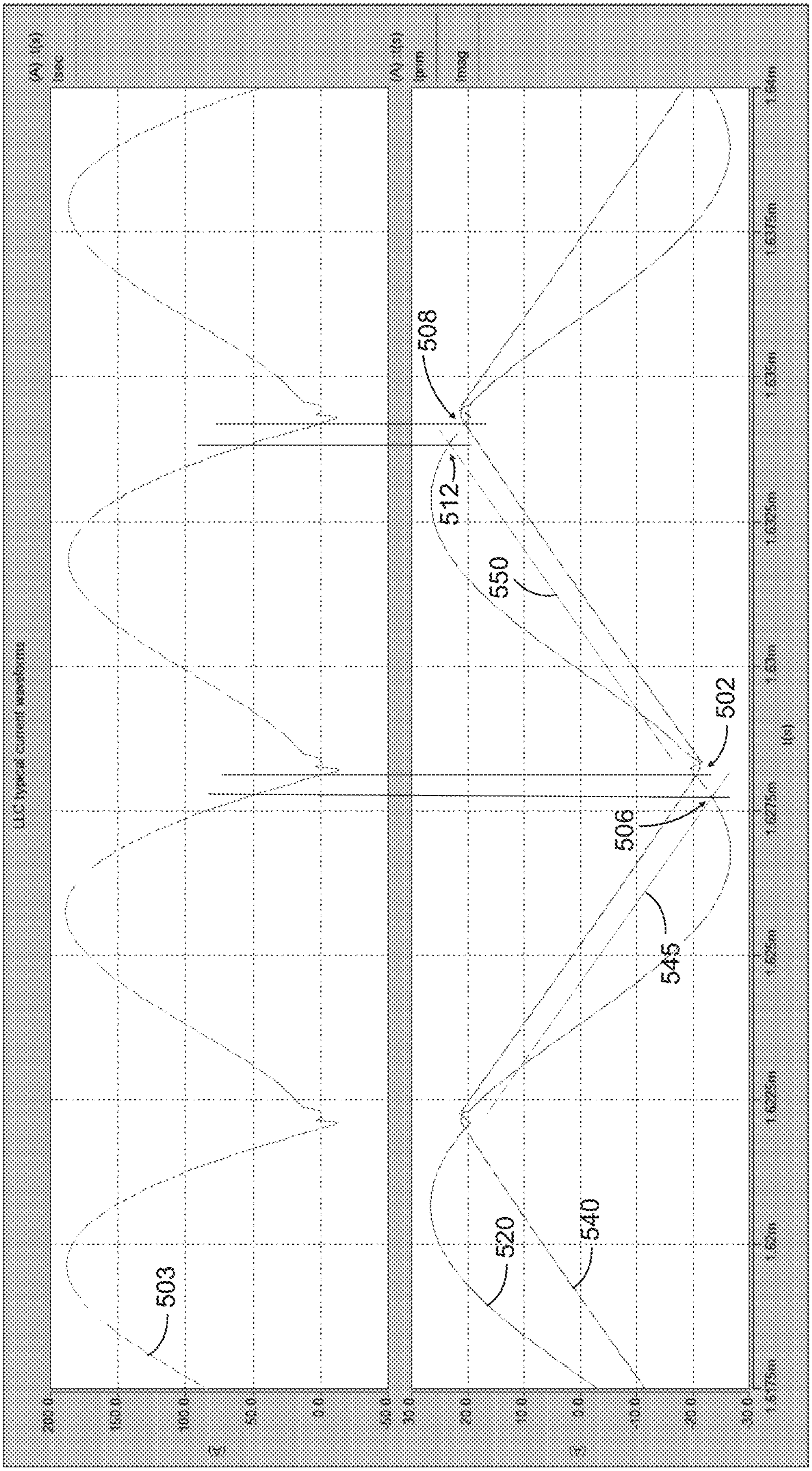
FIG. 4 shows plots illustrating the effect of applying an adjustment to the magnetising current.

The controller and method of the present invention is disclosed with reference to FIGS. 4 and 5, and with continued reference to FIGS. 1 and 2.

As discussed above, the power source 102 outputs direct current (DC) high voltage power, for example at 540 V and 40 A, which is converted by the circuit 105 to a low voltage (e.g. 28 V), high current (e.g. 400 A) DC output. The third and fourth switches 113, 114 supply the resonant capacitor 116 and inductor 118 and transformer primary winding 120A with a high frequency square-wave voltage. Rectification is provided by the first and second switches (111, 112).

Before a first time interval 401, the first switch 111 is in the open configuration and is not conducting, and current is flowing through the secondary side second winding 120B, according to the secondary side negative current path described above. This causes the circuit 105 to output a current shown by the waveform 430.

Figure 3:
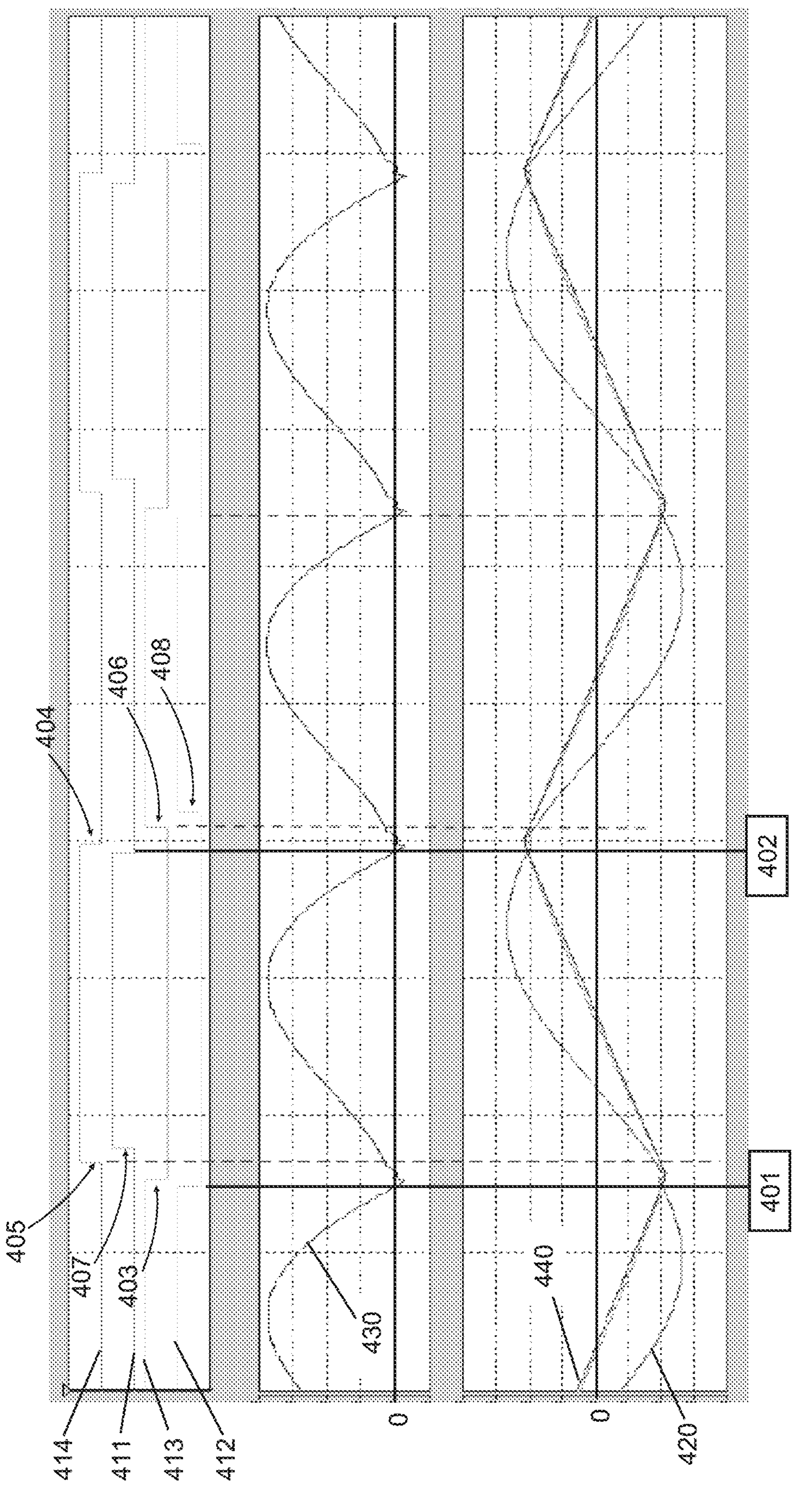
FIG. 3 shows plots of control signals and current waveforms of various components in the isolated LLC synchronous rectifier converter circuit and specifically the synchronous rectifiers.

The control signals 121, 122, 123, 124 provided to the switches 111, 112, 113, 114 respectively are illustrated in FIG. 3 by waveforms 411, 412, 413, 414 respectively.

During this time, the current determination module 107 determines an primary winding current 220 on a primary side of the isolated transformer 120, as shown in the waveform 420.

The estimation module 108 receives the primary side winding 120A voltage through the connection lines 129, 130. The estimation module 108 uses the primary side winding 120A voltage to determine an estimated magnetising current 240 by implementing equation 3 below.

$$I_{mag} = \int \frac{V_p}{L_m} dt \qquad \text{Equation 3}$$

Where $I_{mag}$ is the estimated magnetising current 240, $V_p$ is the primary side winding 120A voltage and $L_m$ is a predetermined value of magnetising inductance.

The estimation module 108 outputs the estimated magnetising current 240, which corresponds to the waveform 440.

The processing module 109 receives both the primary winding current 220 and the estimated magnetising current 240, and uses a processing algorithm to determine the control signals 121, 122, as illustrated by waveforms 411, 412 respectively.

The processing algorithm determines a difference value between the primary winding current 220 and the estimated magnetising current 240. If the difference value is equal to zero, this indicates that an intersection has occurred between the primary winding current 220 and the estimated magnetising current 240, and that the conditions for Equation 2 have been met. In FIG. 3 the waveforms 420 and 440 first intersect at the time interval 401.

As a result of the difference value being zero, the controller 106 changes the output of the second control signal 122 to the second switch 112, to configure the second switch 112 into an open configuration (OFF). This happens at the time interval 401, and is denoted by the waveform 412 changing from a high signal to a low signal.

The waveform 430 shows the rectified secondary winding current 250, which is subsequently smoothed by the output capacitor 126 to provide DC current to the load 110.

As can be seen, at the time interval 401, the secondary winding current 430 is close to zero. As a result, when the second switch 112 changes into the open configuration, its drain current at this time is close to zero, and as such the switching loses are also close to zero. The second switch 112 is thus able to change from the closed configuration to the open configuration without incurring significant switching losses.

Following the time interval 401, the third switch 113 changes state from ON to OFF (i.e. enters the open configuration). This is the end of the switching period of the third switch 113, denoted by the change in waveform 413 at the time interval 403. The third switch 113 changes state as a result of the primary switch controller 128 controlling the third control signal 123 in accordance with pre-set timing characteristics (for example, a pre-set square-wave of a set frequency and duty cycle etc.). The pre-set timing characteristics are based on the capacitance and inductance of the LLC circuit 105, and the resultant sinusoidal current waveform that is produced on the primary side winding 120A of the transformer 120.

An interlock time delay is implemented after the time interval 403 which lasts up until a time interval 405. Between the time interval 403 and 405, none of the control signals 121, 122, 123, 124 are changed, in order to avoid cross-conduction in the circuit.

Once the interlock time delay ends at time interval 405, the switching cycle begins again by the primary switch controller 128 changing the state of the fourth control signal 124 to configure the fourth switch 114 into a closed configuration (ON), as denoted by the change in waveform 414 at the time interval 405.

A further pre-determined time delay after the time interval 405, the first switch 111 is changed into the closed configuration (turned ON) by the controller 106, as denoted by the change in waveform 411 at the time interval 407. This is possible because the controller 106 receives the receives the third and fourth control signals 123, 124, and can thus infer when the configuration of the third or fourth switches 113, 114 is changed.

After the time interval 407, the second and third switches 112, 113 are in the open configurations (OFF) and the first and fourth switches 111, 114 are in the closed configurations (ON). This causes current to flow through the secondary side first winding 120C according to the secondary side positive current path, as discussed above, and the secondary side of the transformer 120 outputs a current as shown in waveform 430.

The second switch 112 provides rectification of a negative component of the power input to the transformer 120, which provides additional output power by the circuit 105.

The current determination module 107, the estimation module 108 and the processing module 109 continue to function as described above. At the time interval 402 the primary winding current 220 and the estimated magnetising current 240 are equal, and the conditions for Equation 2 are met again. As a result, the controller 106 changes the control signals 121, 122, in a similar manner as described above.

In particular, at the time interval 402 the controller 106 changes the output of the first control signal 121 to the first switch 111, to configure the first switch 111 into an open configuration (OFF), as shown by the waveform 411.

A short while after the first switch 111 changes into the open configuration (OFF), the primary switch controller 128 changes the fourth control signal 124 to the fourth switch 114 such that the fourth switch 114 changes to an open configuration (OFF), as denoted by the change in waveform 414 at the time interval 404. The fourth control signal 124 has a set frequency and duty cycle which determine the change of state, as discussed above.

An interlock time delay is implemented after the time interval 404 which lasts up until a time interval 406. Between the time interval 404 and 406, none of the control signals 121, 122, 123, 124 are changed, in order to avoid cross-conduction in the circuit.

Once the interlock time delay ends at time interval 406, the switching cycle begins again by the primary switch controller 128 changing the state of the third control signal 123 to configure the third switch 113 into a closed configuration (ON), as denoted by the change in waveform 413 at the time interval 406.

A pre-determined time delay after the time interval 406, the controller 106 changes the second control signal 122 to the second switch 112 such that the second switch 112 is changed into the closed configuration (turned ON), as denoted by the change in waveform 412 at the time interval 408

After the time interval 408, the first and fourth switches 111, 114 are in the open configurations and the second and third switches 112, 113 are in the closed configurations. This causes current to flow through the secondary side second winding 120B according to the secondary side negative current path, as discussed above, and the secondary side of the transformer 120 outputs a current as shown in waveform 430.

In this manner, the controller 106 provides control signals to the circuit 105 to provide power conversion with minimal switching losses.

As discussed above, the estimation module 108 uses equation 3 to determine the estimated magnetising current 240.

When manufacturing circuits 105 in large volumes, the transformer 120 in each circuit 105 will not be identical, as a result of variation between parts during a manufacturing process. As such, variations in transformer 120 magnetising inductance will cause the magnetising current 240 to vary between each transformer 120. This is problematic for the controller 106, because an error in the estimation of the magnetising current 240 is based on a predetermined or fixed value of magnetising inductance and may cause the control signals 121, 122 to be incorrectly timed (the timing of the control signals is derived from Equations 2 and 3 as discussed above). Other sources of estimated magnetising current error can be introduced by the input signals to the estimating module 108.

To solve this problem and improve the reliability and consistency of the control signals 121, 122, the estimation module applies an adjustment to the estimated magnetising current 240. The adjustment takes into account part to part variations in the transformer 120, or other components in the circuit 105.

In order to determine the most optimal adjustment, a deviation from a statistical average is required.

In FIG. 4, the primary winding current 220 is shown by the waveform 520, the statistical average magnetising current 240 is shown by the waveform 540, and the circuit 105 output current is shown by the waveform 503.

In an instance where the magnetising inductance 245 is in fact significantly greater than expected as a result of the part to part variation, the estimated magnetising current will be significantly higher than the true magnetising current in the positive half cycle period, resulting in non-optimal turn OFF of the (synchronous rectifier) switch.

In an instance where the magnetising inductance 245 is in fact significantly less than expected as a result of the part-to-part variation, the estimated magnetising current will be significantly lower than the true magnetising current in the negative half cycle period, resulting in non-optimal turn OFF of the (synchronous rectifier) switch.

Both of these scenarios will result in:

$$I_p \neq I_{mag} + 0$$

This is because the magnitude of the magnetising current 240 is based on the change in the primary winding current 220. There are thus a number of outcomes as a result of part-to-part variation.

The first identified problem is if the magnetising inductance is significantly greater than the statistical average (i.e. at an Upper Specification Limit). During the positive (increasing) half cycle, the estimated magnetising current 240 (shown by waveform 540), which is estimated based on a statistical average magnetic inductance 245, will have a higher magnitude than the true magnetising current. As a result, the intersection with the primary current waveform (which is determined based on Equation 2 above) will be determined significantly incorrectly. This will result in a non-optimised turn-off (i.e. slightly premature) of the first or second switches 111, 112, which would lead to higher power dissipation compared to switching at the optimum turn-off point. The functional behaviour of the switches 111, 112 would however be unaffected.

The same is true for the negative half cycle. During the negative (decreasing) half cycle, the estimated magnetising current 240 (shown by waveform 540), which is estimated based on a statistical average magnetic inductance 245, will have a higher magnitude than the true magnetising current. As a result, the intersection with the primary current waveform (which is determined based on Equation 2 above) will be determined significantly incorrectly. This is particularly problematic, as it will result in the non-optimised turn-off (i.e. slightly premature) of the first or second switches 111, 112 as described above.

The second identified problem is if the magnetising inductance is less than the statistical average (i.e. at a Lower Specification Limit). During the positive (increasing) half cycle, the estimated magnetising current 240 will have a lower magnitude than the true magnetising current. As a result, the intersection with the primary current waveform (which is determined based on Equation 2 above) will be determined incorrectly. This is particularly problematic, as it will result in the non-optimised turn-off (i.e. slightly late) of the first or second switches 111, 112, which may cause the switches 111, 112 to momentarily continue to conduct when they should be blocking a reverse current. Consequently, the functional behaviour of the first or second switch 111, 112 may be adversely affected.

The same is true for the negative (decreasing) half cycle. During the negative half cycle, the estimated magnetising current 240 will be lower magnitude than the true magnetising current. As a result, the intersection with the primary current waveform (which is determined based on Equation 2 above) will be determined incorrectly. This is particularly problematic, as it will result in the non-optimised turn-off (i.e. slightly late) of the first or second switches 111, 112 as described above.

To account for this, the estimation module 108 first determines if the estimated magnetising current 240 is increasing or decreasing.

Then an adjustment is made by the estimation module 108 to the estimated magnetising current 240. The adjustment is made by the estimation module 108 adding a first constant value when the estimated magnetising current 240 is increasing, as shown in FIG. 4 as line 550; and subtracting a second constant value when the estimated magnetising current 240 is decreasing, as shown as line 545.

The first and second constant values are pre-set and are determined based on the part-to-part deviation of the from the statistical average.

As a result of the adjustment, in the scenario that the transformer 120 has higher than the statistical average magnetising inductance 245, the functional behaviour of the switches 111 & 112 will not be adversely affected. Similarly, if the transformer 120 has lower than the statistical average magnetising inductance 245, the control signal to the switches 111, 112 will not be adversely affected i.e. block reverse current.

However, there is a slight drawback to making this type of adjustment. As a result of using a first and second constant value across all controllers 106, in case where the part-to-part variation is not significantly deviated from the statistical average, the control signal causes the switches 111, 112 to change configuration slightly early. This is shown in FIG. 4, wherein the time interval 502 denotes the un-adjusted intersection for a none-deviated transformer 120, and the time interval 506 denotes an intersection wherein the estimated magnetising current 240 has been adjusted (as shown by line 545).

This scenario is also true for when the estimated magnetising current 240 is increasing, and a similar adjustment is made shown by line 550. As can be seen, the switch is conducting current between a time interval 512 and 508.

However, it has been further determined that the power loss associated with this premature switching is often less than the power loss as a result of not accounting for part to part variation.

Various aspects of the apparatus and methods disclosed in the various embodiments may be used alone, in combination, or in a variety of arrangements not specifically discussed in the embodiments described in the foregoing, and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A controller for an isolated inductor-inductor-capacitor (LLC) power converter circuit, the circuit comprising an isolated transformer, and a first switch operable as a synchronous rectifier on a secondary side of the transformer; the controller comprising:

a current determination module configured to determine a primary winding current on a primary side of the isolated transformer; and a processing module configured to use the determined primary winding current in a processing algorithm to output a first control signal to configure the first switch on the secondary side of the isolated transformer to determine a waveform of a secondary winding current of the isolated transformer;

wherein the processing algorithm is configured to determine a difference value between the determined primary winding current and an estimated magnetising current of the isolated transformer, and use the difference value to determine the first control signal; and wherein if the difference value is equal to zero, the processing module is configured to change the output of the first control signal to the first switch.

2. The controller of claim 1, wherein the change comprises configuring the first switch into an open configuration.

3. The controller of claim 1, wherein the controller comprises an estimation module configured to determine the estimated magnetising current.

4. The controller of claim 1, wherein:

the processing module is further configured to use the determined primary winding current and the estimated magnetising current in the processing algorithm to output a second control signal to configure a second switch on a secondary side of the isolated transformer; and the configuration of the second switch provides rectification of a negative component of the secondary winding current.

5. The controller of claim 4, wherein the controller comprises an estimation module configured to determine the estimated magnetising current;

wherein the estimation module is configured to determine the estimated magnetising current by integrating a primary winding voltage of the transformer with respect to time and dividing by a magnetising inductance;

wherein the estimation module is configured to apply an adjustment to the estimated magnetising current in determining the estimated magnetising current;

wherein the adjustment is indicative of a manufacturing tolerance of the isolated transformer; and wherein the estimation module is configured to apply the adjustment by:

adding a first constant value when the estimated magnetising current is increasing; or subtracting the first or a second constant value when the estimated magnetising current is decreasing.

6. The controller of claim 5, wherein the estimation module is configured to determine if the estimated magnetising current is increasing or decreasing.

7. An isolated inductor-inductor-capacitor (LLC) power converter circuit for converting an input power to provide an output power, the circuit comprising:

an isolated transformer having a primary side and a secondary side;

a first switch operable as a synchronous rectifier on a secondary side of the transformer, wherein the configuration of the first switch determines a waveform of a secondary winding current of the isolated transformer; and a controller as recited in the claim 1.

8. The circuit of claim 7, further comprising:

a second switch on a secondary side of the transformer, wherein the configuration of the second switch provides rectification of a negative component of a transformer secondary side current to provide full wave rectification.

9. An aircraft electrical system comprising an electrical load; and the controller of claim 1.

10. A method for controlling an isolated (inductor-inductor-capacitor) LLC power converter circuit as recited in claim 1, the method comprising:

determining with the current determination module the primary winding current on the primary side of the isolated transformer;

using the determined primary winding current to determine the first control signal for the first switch on the secondary side of the isolated transformer; and implementing the first control signal to control the first switch, wherein the configuration of the first switch determines a waveform of a secondary winding current of the isolated transformer.

11. The method of claim 10, wherein the change comprises configuring the first switch into an open configuration.

12. The method of claim 10, wherein the controller comprises an estimation module configured to determine the estimated magnetising current.

13. The method of claim 12, wherein the estimation module is configured to determine the estimated magnetising current by integrating a primary winding voltage of the transformer with respect to time and dividing by a magnetising inductance.

14. The method of claim 13, wherein the estimation module is configured to apply an adjustment to the estimated magnetising current in determining the estimated magnetising current.

15. A controller for an isolated inductor-inductor-capacitor (LLC) power converter circuit, the circuit comprising an isolated transformer, and a first switch operable as a synchronous rectifier on a secondary side of the transformer; the controller comprising:

a current determination module configured to determine a primary winding current on a primary side of the isolated transformer; and a processing module configured to use the determined primary winding current in a processing algorithm to output a first control signal to configure the first switch on the secondary side of the isolated transformer to determine a waveform of a secondary winding current of the isolated transformer;

wherein the processing algorithm is configured to determine a difference value between the determined primary winding current and an estimated magnetising current of the isolated transformer, and use the difference value to determine the first control signal; and wherein the controller comprises an estimation module configured to determine the estimated magnetising current; and wherein the estimation module is configured to determine the estimated magnetising current by integrating a primary winding voltage of the transformer with respect to time and dividing by a magnetising inductance.

16. The controller of claim 15, wherein the estimation module is configured to apply an adjustment to the estimated magnetising current in determining the estimated magnetising current.

17. The controller of claim 16, wherein the adjustment is indicative of a manufacturing tolerance of the isolated transformer.

* * * * *